United States Patent
Mizuno et al.

(10) Patent No.: US 8,494,293 B2
(45) Date of Patent: Jul. 23, 2013

(54) IMAGE PROCESSOR

(75) Inventors: Yusuke Mizuno, Osaka (JP); Yujiro Tani, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 227 days.

(21) Appl. No.: 13/153,913

(22) Filed: Jun. 6, 2011

(65) Prior Publication Data
US 2011/0305402 A1    Dec. 15, 2011

(30) Foreign Application Priority Data
Jun. 15, 2010    (JP) .................................. 2010-135735

(51) Int. Cl.
*G06K 9/36*    (2006.01)

(52) U.S. Cl.
USPC .......................................... 382/238; 382/232

(58) Field of Classification Search
USPC .......................... 382/232, 233, 240, 238, 248
See application file for complete search history.

(56) References Cited

U.S. PATENT DOCUMENTS
2009/0238477 A1    9/2009    Uchiyama et al.

FOREIGN PATENT DOCUMENTS
JP    2009-232217    10/2009

*Primary Examiner* — Duy M Dang
(74) *Attorney, Agent, or Firm* — Oblon, Spivak, McClelland, Maier & Neustadt, L.L.P.

(57) ABSTRACT

The image processor 1 includes a frequency transform unit 12, an encoding unit 15, and a memory 4. The encoding unit 15 includes a DC processing unit 31 that generates a direct-current stream, an LP processing unit 32 that generates a low-frequency stream, an HP processing unit 33 that generates an upper high-frequency stream and a lower high-frequency stream, and an output unit 34 having output ports 41 to 44 to output the direct-current stream, the low-frequency stream, the upper high-frequency stream, and the lower high-frequency stream to the memory 4.

19 Claims, 8 Drawing Sheets

| NUMBER OF BITS DISCARDED | REDUCED AMOUNT OF CODE |
|---|---|
| 1 | ○○ BITS |
| 2 | ○○ BITS |
| 3 | ○○ BITS |
| 4 | ○○ BITS |
| ⋮ | ⋮ |
| 15 | ○○ BITS |

FIG. 8A

|    | D0  | D1  | D2  | D3  | D4  | D5  |
|----|-----|-----|-----|-----|-----|-----|
| FG | 1   | 1   | 0   | 0   | 0   | 0   |
| FB | 000 | 010 | 000 | 001 | 010 | 101 |
| SB | —   | —   | —   | 0   | 1   | 0   |

FIG. 8B

|    | D0 | D1 | D2 | D3 | D4 | D5 |
|----|----|----|----|----|----|----|
| FG | 1  | 1  | 0  | 0  | 0  | 0  |
| FB | 00 | 01 | 00 | 00 | 01 | 10 |
| SB | —  | —  | —  | —  | 1  | 0  |

IMAGE PROCESSOR

CROSS-REFERENCE TO RELATED APPLICATIONS

This application claims priority to Japanese Patent Application No. 2010-135735. The entire disclosure of Japanese Patent Application No. 2010-135735 is hereby incorporated herein by reference.

BACKGROUND OF THE INVENTION

1. Field of the Invention

The present invention generally relates to image processors, and more particularly, to an image processor that processes images in JPEG XR format.

2. Description of the Background Art

An image processor that processes an image in JPEG XR (or HD Photo) format is disclosed in, for example, JP2009-232217A. The image processor includes an encoder and a decoder. The encoder includes a color conversion unit, a frequency transform unit, a quantization unit, a prediction unit, an encoding unit, and the like. The decoder includes a decoding unit, an inverse prediction unit, a dequantization unit, a frequency inverse transform unit, a color inverse conversion unit, and the like.

Streaming modes in JPEG XR include two modes, namely, a spatial mode and a frequency mode. In the spatial mode, a stream of one image is configured such that data of each macroblock within one image is sequentially arranged. In the frequency mode, a stream of one image is configured such that a stream of data of direct-current component of all macroblocks in one image, a stream of data of low-frequency component of all macroblocks in one image, a stream of upper (or more significant) data (NORMAL DATA) of high-frequency component of all macroblocks in one image, and a stream of lower (or less significant) data (FLEXBITS) of high-frequency component of all macroblocks in one image are sequentially arranged.

Since encoding in JPEG XR is performed macroblock by macroblock, a stream in the spatial mode is easily generated with hardware. In contrast, generating a stream in the frequency mode with hardware requires the first processing on an image to generate a stream of data of direct-current component of all macroblocks in the image, the second processing on the same image to generate a data stream of data of low-frequency component of all macroblocks in the image, the third processing on the same image to generate a stream of upper data of high-frequency component of all macroblocks in the image, and then the fourth processing on the same image to generate a stream of lower data of high-frequency component of all macroblocks in the image. In this way, processing on the same image needs to be repeated four times, which causes a problem that time required for processing is increased.

SUMMARY OF THE INVENTION

It is an object of the present invention to obtain an image processor that reduces time required for processing in generating a stream in a frequency mode in JPEG XR with hardware.

An image processor according to a first aspect of the present invention includes a transform unit performs predetermined transform on pixel data pieces of a predetermined pixel block in an image to generate frequency data of direct-current component, frequency data of low-frequency component, and frequency data of high-frequency component, an encoding unit, and a memory. The encoding unit includes a direct-current processing unit that sequentially performs predetermined encoding on frequency data of direct-current component of each of pixel blocks in the image to generate a direct-current stream including frequency data pieces of direct-current component of the image, a low-frequency processing unit that sequentially performs predetermined encoding on frequency data of low-frequency component of each of the pixel blocks in the image to generate a low-frequency stream including frequency data pieces of low-frequency component of the image, a high-frequency processing unit that sequentially performs predetermined encoding on frequency data of high-frequency component of each of the pixel blocks in the image to generate an upper high-frequency stream including upper data pieces in a digit range to the upper side of a predetermined position of frequency data pieces of high-frequency component of the image and a lower high-frequency stream including lower data pieces in a digit range to the lower side of the predetermined position of the frequency data pieces of high-frequency component of the image and an output unit having output ports to output the direct-current stream, the low-frequency stream, the upper high-frequency stream, and the lower high-frequency stream to the memory.

The output unit of the image processor according to the first aspect includes the output ports to output a direct-current stream, a low-frequency stream, an upper high-frequency stream, and a lower high-frequency stream to the memory. This enables a parallel output of streams of the direct-current stream, the low-frequency stream, the upper high-frequency stream, and the lower high-frequency stream from the output ports to the memory. As a result, processing on the same image does not need to be repeated four times in generating a stream in a frequency mode in JPEG XR using hardware, and therefore time required for processing is reduced.

Preferably the output unit has a first output port to output the direct-current stream, a second output port to output the low-frequency stream, a third output port to output the upper high-frequency stream, and a fourth output port to output the lower high-frequency stream.

This enables a parallel output of the direct-current stream, the low-frequency stream, the upper high-frequency stream, and the lower high-frequency stream respectively from the first output port, the second output port, the third output port, and the fourth output port to the memory. As a result, processing on the same image once is sufficient in generating a stream in a frequency mode in JPEG XR using hardware, and therefore time required for processing is further reduced.

Preferably the image processor further includes a decoding unit including an input unit having input ports to receive an input of the direct-current stream, the low-frequency stream, the upper high-frequency stream, and the lower high-frequency stream from the memory.

The input unit includes input ports to receive an input of the direct-current stream, the low-frequency stream, the upper high-frequency stream, and the lower high-frequency stream from the memory. This enables a parallel input of streams of the direct-current stream, the low-frequency stream, the upper high-frequency stream, and the lower high-frequency stream from the memory to the input ports. As a result, reading for the same image does not need to be repeated four times in reading a stream in a frequency mode in JPEG XR from the memory to input to the decoding unit, and therefore time required for processing is reduced. Moreover, in the frequency mode, frequency data of direct-current component, frequency data of low-frequency component, upper data of frequency data of high-frequency component, and lower data of frequency data of high-frequency component of each macroblock are separately stored in areas in the memory. However, the image processor reads these frequency data corresponding to the same macroblock out of respective storage areas and inputs to the decoding unit, every time data is required for decoding. This enables the decoding unit to perform decoding of each macroblock with no problem.

Preferably the input unit of the image processor has a first input port to input the direct-current stream, a second input port to input the low-frequency stream, a third input port to input the upper high-frequency stream, and a fourth input port to input the lower high-frequency stream.

This enables a parallel input of the direct-current stream, the low-frequency stream, the upper high-frequency stream, and the lower high-frequency stream from the memory respectively to the first input port, the second input port, the third input port, and the fourth input port. As a result, reading for the same macroblock once is sufficient in reading a stream in a frequency mode in JPEG XR from the memory to input to the decoding unit, and therefore time required for processing is further reduced.

Preferably the decoding unit of the image processor includes a setting unit that sets a reduction ratio of the image, and a selection unit that selects at least one stream from the direct-current stream, the low-frequency stream, the upper high-frequency stream, and the lower high-frequency stream to input from the memory to the decoding unit, based on the reduction ratio set by the setting unit.

The selection unit selects at least one stream from the direct-current stream, the low-frequency stream, the upper high-frequency stream, and the lower high-frequency stream to input from the memory to the decoding unit, based on the reduction ratio set by the setting unit. When the reduction ratio is set at 1/16, for example, only the direct-current stream is selected, and when the reduction ratio is set at 1/4, the direct-current stream and the low-frequency stream are selected. This facilitates creation of a reduced image. Moreover, preventing an input from the memory to the decoding unit of an unnecessary stream that is not used for creation of a reduced image helps avoidance of useless decoding of the unnecessary stream.

Preferably the encoding unit of the image processor further includes a holding unit that holds an amount of code of the image to be reduced by discarding a digit from each of the lower data pieces in an ascending order from the least significant digit, for each number of digits to be discarded.

The holding unit holds an amount of code of the image to be reduced by discarding a digit from each of the lower data pieces in an ascending order from the least significant digit, for each number of digits to be discarded. Thus use of the information held in the holding unit facilitates control of an amount of code to achieve an amount of code of an image equal to or less than a target amount of code.

Preferably the image processor further includes a code amount control unit, and the output unit has a fifth output port to output, to the code amount control unit, information data including information indicating whether a value of each of the upper data pieces is zero or not and information indicating a bit length of each of the lower data pieces. The code amount control unit includes a setting unit that refers to the holding unit to set a number of digits to be discarded from each of the lower data pieces to achieve an amount of code of the image equal to or less than a target amount of code, and a re-encoding unit that performs re-encoding on the lower high-frequency stream stored in the memory, based on the information data and a number of digits to be discarded set by the setting unit.

The information data including information indicating whether a value of each of the upper data pieces is zero or not and information indicating a bit length of each of the lower data pieces is inputted from the encoding unit to the code amount control unit. The setting unit refers to the holding unit to set a number of digits to be discarded from each of the lower data pieces to achieve an amount of code of the image equal to or less than a target amount of code. Then the re-encoding unit performs re-encoding on the lower high-frequency stream stored in the memory, based on the information data and a number of digits to be discarded set by the setting unit. In this way, re-encoding is performed on the lower high-frequency stream so that a part (or all) of each piece of the lower data is discarded, and decoding of the lower high-frequency stream after re-encoding is performed, so as to achieve an amount of code of a decoded image outputted from the decoder that is equal to or less than the target amount of code.

Preferably the image processor further includes a code amount control unit, and the output unit has a fifth output port to output, to the code amount control unit, information data including information indicating whether a value of each of the upper data pieces is zero or not and information indicating a bit length of each of the lower data pieces. The code amount control unit includes a setting unit that refers to the holding unit to set a number of digits to be discarded from each of the lower data pieces to achieve an amount of code of the image equal to or less than a target amount of code and an input control unit that controls an input of the lower high-frequency stream from the memory to the decoding unit, based on the information data and a number of digits to be discarded set by the setting unit.

The information data including information indicating whether a value of each of the upper data pieces is zero or not and information indicating a bit length of each of the lower data pieces is inputted from the encoding unit to the code amount control unit. The setting unit refers to the holding unit to set a number of digits to be discarded from each of the lower data pieces to achieve an amount of code of the image equal to or less than a target amount of code. Then the input control unit controls an input of the lower high-frequency stream from the memory to the decoding unit, based on the information data and a number of digits to be discarded set by the setting unit. Control by the input control unit to prevent an input of a part (or all) of each piece of the lower data from the memory to the decoding unit substantially realizes an input to the decoding unit of the lower high-frequency stream with a part (or all) of each piece of the lower data being discarded. Decoding such lower high-frequency stream achieves an amount of code of a decoded image outputted from the decoder that is equal to or less than the target amount of code.

An image processor according to a second aspect of the present invention includes a decoding unit, and a memory that stores a direct-current stream including frequency data pieces of direct-current component of an image obtained by sequentially performing predetermined encoding on frequency data of direct-current component of each of pixel blocks in the image, a low-frequency stream including frequency data pieces of low-frequency component of the image obtained by sequentially performing predetermined encoding on frequency data of low-frequency component of each of the pixel blocks in the image, and an upper high-frequency stream including upper data pieces in a digit range to the upper side of a predetermined position of frequency data pieces of high-frequency component of the image and a lower high-frequency stream including lower data pieces in a digit range to the lower side of the predetermined position of the frequency data pieces of high-frequency component of the image, obtained by sequentially performing predetermined encoding on frequency data of high-frequency component of each of the pixel blocks in the image. The decoding unit includes a setting unit that sets a reduction ratio of the image and a selection unit that selects at least one stream from the direct-current stream, the low-frequency stream, the upper high-frequency stream, and the lower high-frequency stream to input from the memory to the decoding unit, based on the reduction ratio set by the setting unit.

The selection unit selects at least one stream from the direct-current stream, the low-frequency stream, the upper high-frequency stream, and the lower high-frequency stream to input from the memory to the decoding unit, based on the reduction ratio set by the setting unit. When the reduction ratio is set at 1/16, for example, only the direct-current stream is selected, and when the reduction ratio is set at 1/4, the direct-current stream and the low-frequency stream are selected. This facilitates creation of a reduced image. Moreover, preventing an input from the memory to the decoding unit of an unnecessary stream that is not used for creation of a reduced image helps avoidance of useless decoding of the unnecessary stream.

An image processor according to a third aspect of the present invention includes a decoding unit, a memory, a code amount control unit, and a holding unit. The memory stores a direct-current stream including frequency data pieces of direct-current component of an image obtained by sequentially performing predetermined encoding on frequency data of direct-current component of each of pixel blocks in the image, a low-frequency stream including frequency data pieces of low-frequency component of the image obtained by sequentially performing predetermined encoding on frequency data of low-frequency component of each of the pixel blocks in the image, and an upper high-frequency stream including upper data pieces in a digit range to the upper side of a predetermined position of frequency data pieces of high-frequency component of the image and a lower high-frequency stream including lower data pieces in a digit range to the lower side of the predetermined position of the frequency data pieces of high-frequency component of the image, obtained by sequentially performing predetermined encoding on frequency data of high-frequency component of each of the pixel blocks in the image. The holding unit holds an amount of code of the image to be reduced by discarding a digit from each of the lower data pieces in an ascending order from the least significant digit, for each number of digits to be discarded. The code amount control unit includes a setting unit that refers to the holding unit to set a number of digits to be discarded from each of the lower data pieces to achieve an amount of code of the image equal to or less than a target amount of code and a re-encoding unit that performs re-encoding on the lower high-frequency stream stored in the memory, based on information indicating whether a value of each of the upper data pieces is zero or not, information indicating a bit length of each of the lower data pieces, and a number of digits to be discarded set by the setting unit.

The holding unit holds an amount of code of the image to be reduced by discarding a digit from each of the lower data pieces in an ascending order from the least significant digit, for each number of digits to be discarded. The setting unit refers to the holding unit to set a number of digits to be discarded from each of the lower data pieces to achieve an amount of code of the image equal to or less than a target amount of code. Then the re-encoding unit performs re-encoding on the lower high-frequency stream stored in the memory, based on information indicating whether a value of each of the upper data pieces is zero or not, information indicating a bit length of each of the lower data pieces, and a number of digits to be discarded set by the setting unit. In this way, re-encoding is performed on the lower high-frequency stream so that a part (or all) of each piece of the lower data is discarded, and decoding of the lower high-frequency stream after re-encoding is performed, so as to achieve an amount of code of a decoded image outputted from the decoder that is equal to or less than the target amount of code.

An image processor according to a fourth aspect of the present invention includes a decoding unit, a memory, a code amount control unit and a holding unit. The memory stores a direct-current stream including frequency data pieces of direct-current component of an image obtained by sequentially performing predetermined encoding on frequency data of direct-current component of each of pixel blocks in the image, a low-frequency stream including frequency data pieces of low-frequency component of the image obtained by sequentially performing predetermined encoding on frequency data of low-frequency component of each of the pixel blocks in the image, and an upper high-frequency stream including upper data pieces in a digit range to the upper side of a predetermined position of frequency data pieces of high-frequency component of the image and a lower high-frequency stream including lower data pieces in a digit range to the lower side of the predetermined position of the frequency data pieces of high-frequency component of the image, obtained by sequentially performing predetermined encoding on frequency data of high-frequency component of each of the pixel blocks in the image. The holding unit holds an amount of code of the image to be reduced by discarding a digit from each of the lower data pieces in an ascending order from the least significant digit, for each number of digits to be discarded. The code amount control unit includes a setting unit that refers to the holding unit to set a number of digits to be discarded from each of the of lower data pieces to achieve an amount of code of the image equal to or less than a target amount of code and an input control unit that controls an input from the memory to the decoding unit of the lower high-frequency stream stored, based on information indicating whether a value of each of the upper data pieces is zero or not, information indicating a bit length of each of the lower data pieces, and a number of digits to be discarded set by the setting unit.

The holding unit holds an amount of code of the image to be reduced by discarding a digit from each of the lower data pieces in an ascending order from the least significant digit, for each number of digits to be discarded. The setting unit refers to the holding unit to set a number of digits to be discarded from each of the of lower data pieces to achieve an amount of code of the image equal to or less than a target amount of code. Then the input control unit controls an input from the memory to the decoding unit of the lower high-frequency stream, based on information indicating whether a value of each of the upper data pieces is zero or not, information indicating a bit length of each of the lower data pieces, and a number of digits to be discarded set by the setting unit. Control by the input control unit to prevent an input of a part (or all) of each piece of the lower data from the memory to the decoding unit substantially realizes an input to the decoding unit of the lower high-frequency stream with a part (or all) of each piece of the lower data being discarded. Decoding such lower high-frequency stream achieves an amount of code of a decoded image outputted from the decoder that is equal to or less than the target amount of code.

The present invention achieves an image processor that reduces time required for processing in generating a stream in a frequency mode in JPEG XR using hardware.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates an example of a data table held by a holding unit.

FIGS. 8A and 8B illustrate an example of frequency data pieces.

DESCRIPTION OF THE PREFERRED EMBODIMENTS

Figure 1:
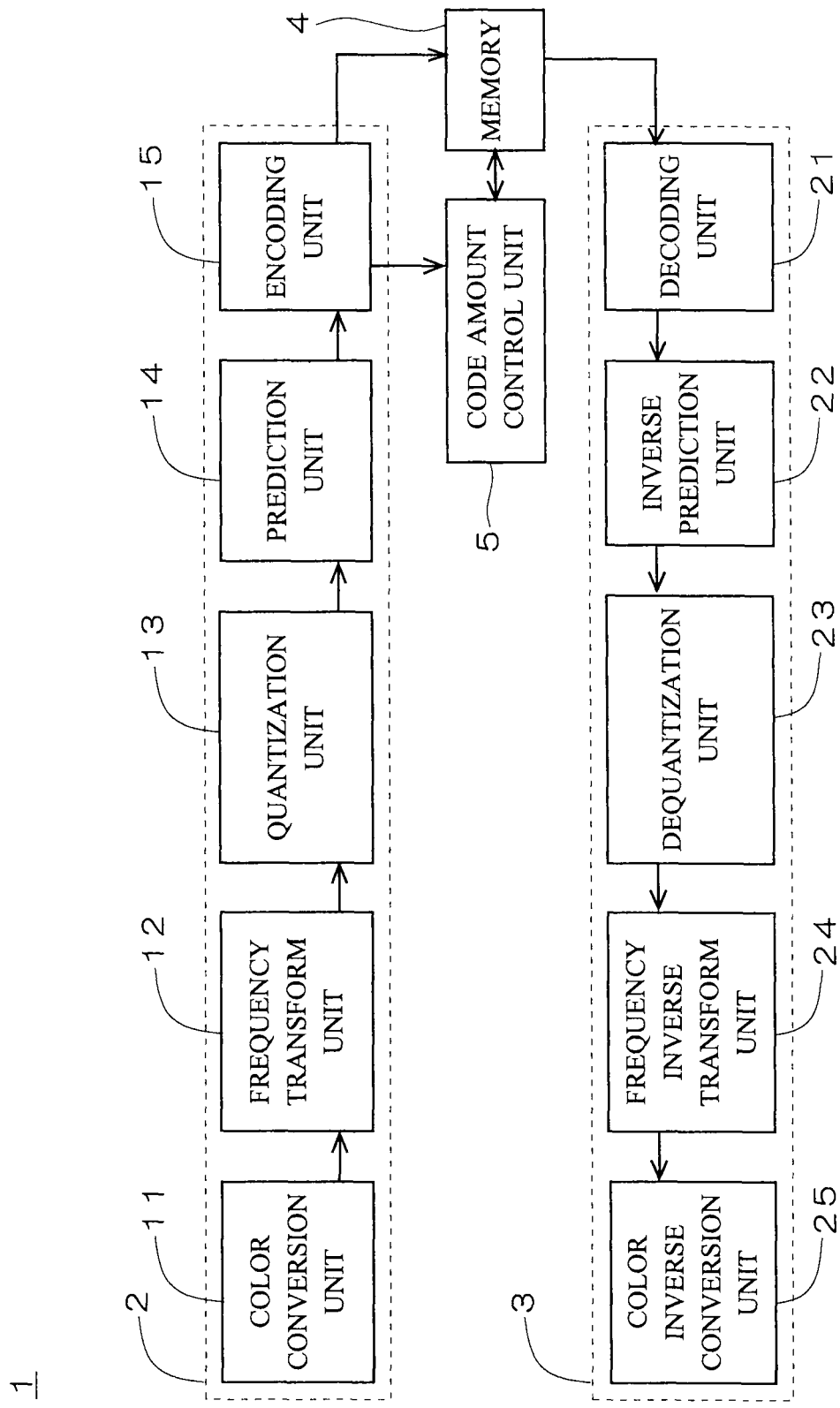
FIG. 1 is a block diagram illustrating an overall configuration of an image processor according to an embodiment of the present invention.

Preferred embodiments of the present invention are described in detail below referring to the drawings. It should be noted that identical reference numerals throughout the drawings indicate identical or equivalent elements.

FIG. 1 is a block diagram illustrating an overall configuration of an image processor 1 according to an embodiment of the present invention. The image processor 1 includes an encoder 2, a decoder 3, a memory 4, and a code amount control unit 5. The encoder 2 includes a color conversion unit 11, a frequency transform unit 12, a quantization unit 13, a prediction unit 14, and an encoding unit 15. The decoder 3 includes a decoding unit 21, an inverse prediction unit 22, a dequantization unit 23, a frequency inverse transform unit 24, and a color inverse conversion unit 35.

The color conversion unit 11 receives an input of pixel data of RGB color space from an imaging element, such as a CCD or CMOS image sensor. The color conversion unit 11 converts the pixel data of RGB color space into pixel data of, for example, YUV color space, and outputs the same.

The pixel data is inputted from the color conversion unit 11 to the frequency transform unit 12. The frequency transform unit 12 performs predetermined frequency transform (HD Photo Core Transform: PCT) on the pixel data, so as to generate and output frequency data.

Figure 2:
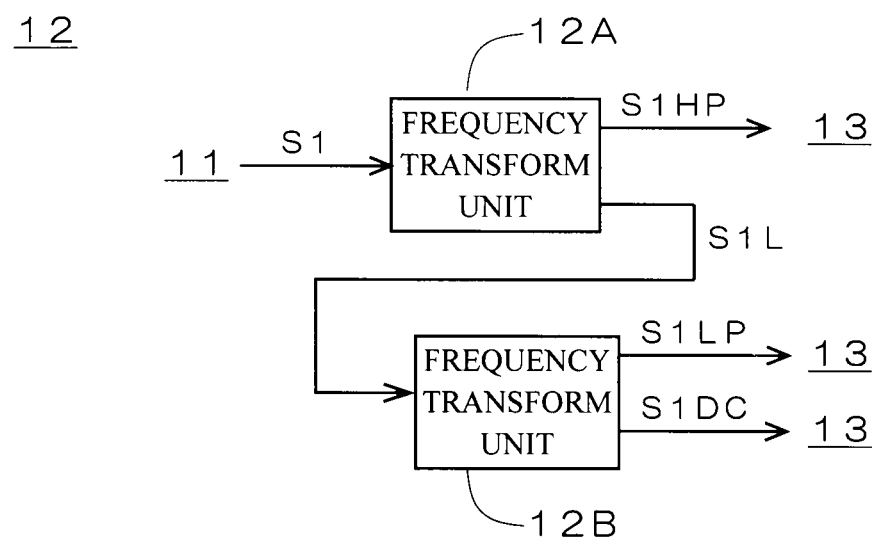
FIG. 2 is a block diagram specifically illustrating a configuration of a frequency transform unit.

FIG. 2 is a block diagram specifically illustrating a configuration of a frequency transform unit. As illustrated in FIG. 2, the encoder 2 of JPEG XR includes a frequency transform unit 12A in a first stage and a frequency transform unit 12B in a second stage.

The frequency transform unit 12A performs frequency transform (PCT) on pixel data S1 inputted from the color conversion unit 11, so as to generate and output frequency data S1HP of high-frequency (HP) component and data S1L of direct-current component in the first stage. The data S1L is inputted to the frequency transform unit 12B. The frequency transform unit 12B performs frequency transform (PCT) on the data S1L, so as to generate and output frequency data S1LP of low-frequency (LP) component and frequency data S1DC of direct-current (DC) component.

In this way, according to JPEG XR, the frequency transform unit 12A in the first stage outputs the frequency data S1HP of high-frequency component, and the frequency transform unit 12B in the second stage outputs the frequency data S1LP of low-frequency component and the frequency data S1DC of direct-current component. Frequency transform of a macroblock consisting of 16 pixels in column×16 pixels in row results in output of 240 pieces of frequency data S1HP, 15 pieces of frequency data S1LP, and one piece of frequency data S1DC.

Referring to FIG. 1, the quantization unit 13 receives an input of the frequency data S1HP, S1LP, and S1DC from the frequency transform unit 12. The quantization unit 13 uses a quantization coefficient as set to perform predetermined quantization on the frequency data S1HP, S1LP, and S1DC.

The prediction unit 14 receives an input of the frequency data S1HP, S1LP, and S1DC after quantization from the quantization unit 13. The prediction unit 14 performs predetermined prediction on the frequency data S1HP, S1LP, and S1DC.

The encoding unit 15 receives an input of the frequency data S1HP, S1LP, and S1DC after prediction from the prediction unit 14. The encoding unit 15 performs predetermined encoding on the frequency data S1HP, S1LP, and S1DC.

Figure 3:
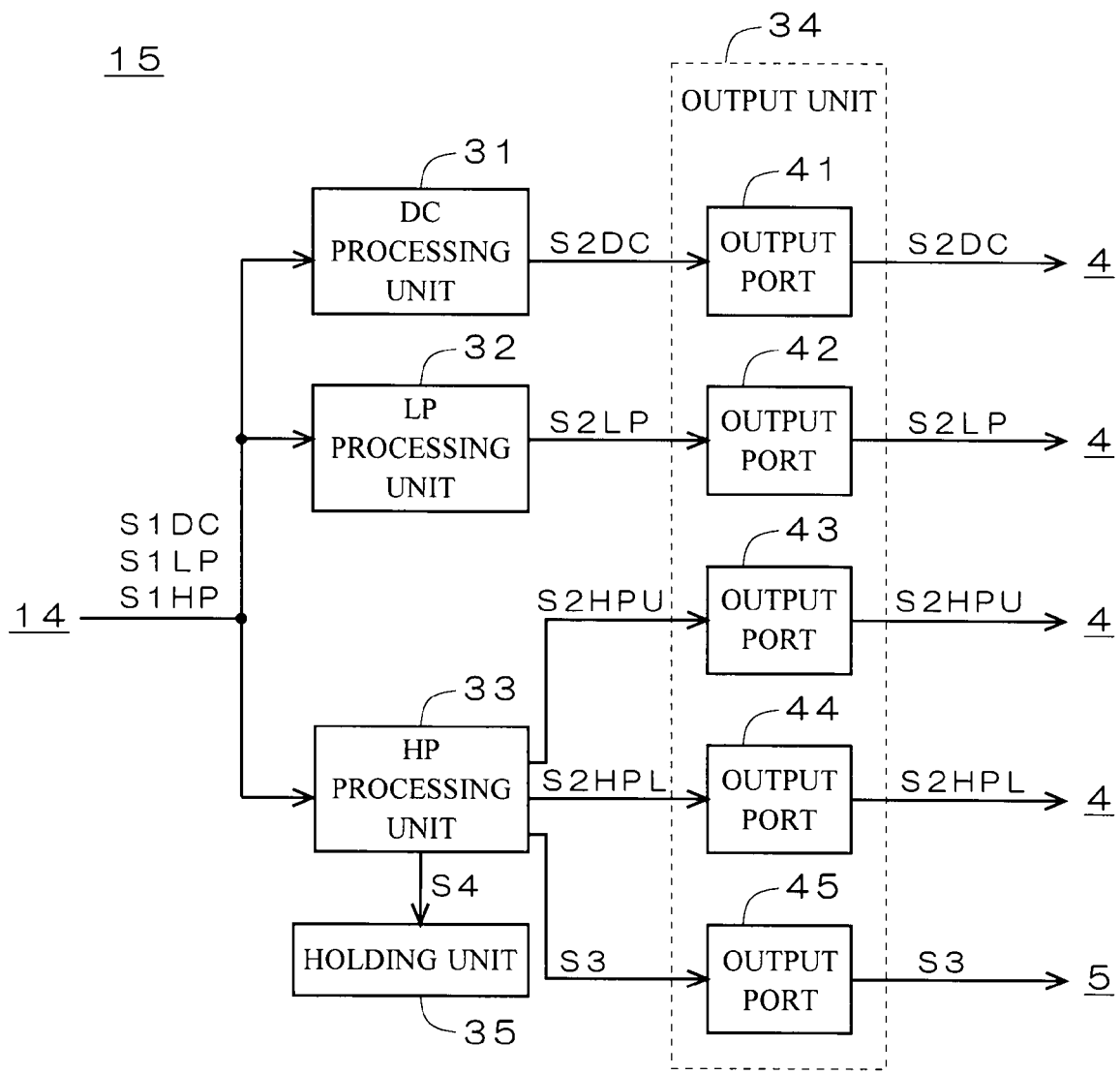
FIG. 3 is a block diagram specifically illustrating a configuration of an encoding unit.

FIG. 3 is a block diagram specifically illustrating a configuration of the encoding unit 15. The encoding unit 15 includes a DC processing unit 31, an LP processing unit 32, an HP processing unit 33, an output unit 34, and a holding unit 35. The output unit 34 includes output ports 41 to 44 that allow access to the memory 4 in a direct memory access (DMA) mode, and an output port 45 that is connected to the code amount control unit 5.

The DC processing unit 31 performs entropy coding on the frequency data S1DC inputted from the prediction unit 14, so as to generate and output frequency data S2DC. The frequency data S2DC is outputted from the output port 41 to the memory 4. The DC processing unit 31 sequentially receives an input of the frequency data S1DC of each of the macroblocks in an image, and sequentially outputs the frequency data S2DC of each of the macroblocks. The DC processing unit 31 thereby outputs a data stream in which the frequency data S2DC of all macroblocks in the image are arranged (hereinafter referred to as a "direct-current stream"). Then the direct-current stream is outputted from the output port 41 to the memory 4.

The LP processing unit 32 performs entropy coding on the frequency data S1LP inputted from the prediction unit 14, so as to generate and output frequency data S2LP. The frequency data S2LP is outputted from the output port 42 to the memory 4. The LP processing unit 32 sequentially receives an input of the frequency data S1LP of each of the macroblocks in an image, and sequentially outputs the frequency data S2LP of each of the macroblocks. The LP processing unit 32 thereby outputs a data stream in which the frequency data S2LP of all macroblocks in the image are arranged (hereinafter referred to as a "low-frequency stream"). Then the low-frequency stream is outputted from the output port 42 to the memory 4.

Figure 4:
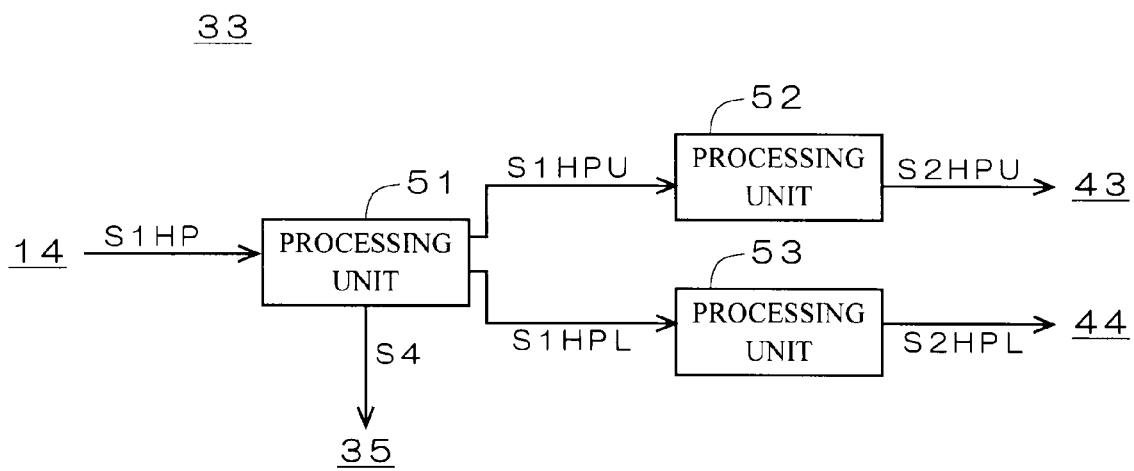
FIG. 4 is a block diagram specifically illustrating a configuration of an HP processing unit.
Figure 5:
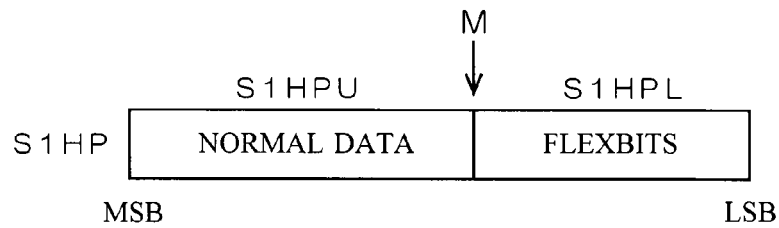
FIG. 5 illustrates frequency data.

FIG. 4 is a block diagram specifically illustrating a configuration of an HP processing unit 33. FIG. 5 shows frequency data S1HP. The HP processing unit 33 includes processing units 51, 52, and 53.

The processing unit 51 divides the absolute value portion of the frequency data S1HP inputted from the prediction unit 14 into upper data S1HPU (NORMAL DATA) in a digit range to the upper (more significant) side of a predetermined position M and lower data S1HPL (FLEXBITS) in a digit range to the lower (less significant) side of the predetermined position M, and output the same. In JPEG XR, the predetermined position M can be changed per macroblock.

The processing unit 52 performs entropy coding on the upper data S1HPU inputted from the processing unit 51, so as to generate and output upper data S2HPU. The upper data S2HPU is outputted from the output port 43 to the memory 4. The processing unit 52 sequentially receives an input of the upper data S1HPU of each of the macroblocks in an image, and sequentially outputs the upper data S2HPU of each of the macroblocks. The processing unit 52 thereby outputs a data stream in which the upper data S2HPU of all macroblocks in the image are arranged (hereinafter referred to as an "upper high-frequency stream"). Then the upper high-frequency stream is outputted from the output port 43 to the memory 4.

The processing unit 53 outputs the lower data S1HPL inputted from the processing unit 51 as lower data S2HPL without performing entropy coding. The lower data S2HPL is outputted from the output port 44 to the memory 4. The processing unit 53 sequentially receives an input of the lower data S1HPL of each of the macroblocks in an image, and sequentially outputs the lower data S2HPL of each of the macroblocks. The processing unit 53 thereby outputs a data stream in which the lower data S2HPL of all macroblocks in the image are arranged (hereinafter referred to as a "lower high-frequency stream"). Then the lower high-frequency stream is outputted from the output port 44 to the memory 4.

Moreover, the processing unit 51 extracts sign data indicating a sign (positive or negative) of the frequency data S1HP. When the value of the upper data S1HPU is not zero, the sign data is also encoded when the processing unit 52 performs entropy coding on the upper data S1HPU. When the value of the upper data S1HPU is zero and the value of the lower data S1HPL is not zero, the sign data is added to the lower data S2HPL as a SIGN BIT. When the values of the upper data S1HPU and the lower data S1HPL are both zero, no sign data exists, and thus no SIGN BIT is added to the lower data S2HPL.

Figure 6:
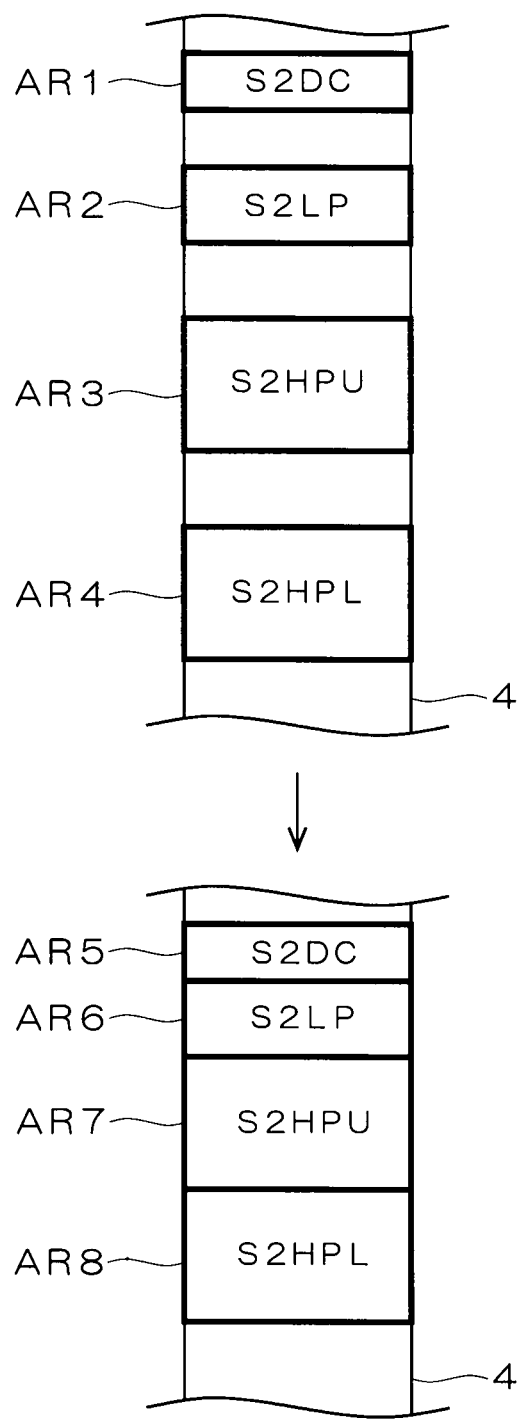
FIG. 6 illustrates a part of storage region of a memory.

As stated above, the direct-current stream, the low-frequency stream, the upper high-frequency stream, and the lower high-frequency stream are respectively outputted from the output ports 41, 42, 43, and 44 to the memory 4. FIG. 6 illustrates a part of storage region of the memory 4. The direct-current stream (frequency data S2DC), the low-frequency stream (frequency data S2LP), the upper high-frequency stream (upper data S2HPU), and the lower high-frequency stream (lower data S2HPL) respectively outputted from the output ports 41, 42, 43, and 44 are respectively stored in areas AR1, AR2, AR3, and AR4 of the memory 4. After data for one image has been stored, relocation is performed to clear spaces between the areas AR1, AR2, AR3, and AR4, and thereby the direct-current stream, the low-frequency stream, the upper high-frequency stream, and the lower high-frequency stream are respectively stored in consecutive areas AR5, AR6, AR7, and AR8 in the memory 4 as an image file. A stream in the frequency mode is thus generated.

In JPEG XR, it is possible to set a parameter TRIM FLEXBITS indicating a number of digits to be discarded from FLEXBITS in an ascending order from its least significant bit. The TRIM FLEXBITS can be set at an arbitrary value within a range from "0" to "15" inclusive for each image. When the TRIM FLEXBITS is set at "3" for a certain image, for example, the lowest 3 bits in all of the FLEXBITS within the image are discarded.

Referring to FIG. 3, the holding unit 35 holds information indicating each amount of code of an image to be reduced when the TRIM FLEXBITS is set at each of the values from "1" to "15" in a form of a data table. FIG. 7 illustrates an example of a data table 60 held by the holding unit 35. Set values of the TRIM FLEXBITS (number of bits to be discarded) and reduced amounts of code corresponding to respective set values are described for each number of bits to be discarded.

The reduced amount of code is obtained by the processing unit 51 illustrated in FIG. 4. FIGS. 8A and 8B illustrate an example of pieces of the frequency data S1HP (data D0 to D5). FIG. 8A illustrate an example of the frequency data S1HP when the FLEXBITS has a bit length of 3 bits. "FG" in the figure is a value of a flag indicating whether the value of the NORMAL DATA of the data D0 to D5 is zero or not. When the value of the NORMAL DATA is not zero, the value of the flag "FG" is "1", while when the value of the NORMAL DATA is zero, the value of the flag "FG" is "0". "FB" in the figure is the lower data S1HPL of the data D0 to D5. "SB" in the figure is a SIGN BIT added to the lower data S1HPL of the data D0 to D5.

Regarding the data D0 and D1, since the value of the NORMAL DATA is not zero, no SIGN BIT is added to the lower data S1HPL, regardless of the value of the lower data S1HPL. Regarding the data D2, since the value of the NORMAL DATA is zero and the value of the lower data S1HPL is also zero, no SIGN BIT is added to the lower data S1HPL. Regarding the data D3 to D5, since the value of the NORMAL DATA is zero and the value of the lower data S1HPL is not zero, a SIGN BIT "0" (positive) or "1" (negative) is added to the lower data S1HPL.

FIG. 8B illustrates an example of a case where the TRIM FLEXBITS is set at "1" for the frequency data S1HP illustrated in FIG. 8A. Regarding the data D0, the least significant bit "0" is discarded from the lower data S1HPL of "000", so that the amount of code is reduced by 1 bit. Regarding the data D1 and D2, the amount of code is similarly reduced by 1 bit each. Regarding the data D3, the least significant bit "1" is discarded from the lower data S1HPL of "001", and the SIGN BIT is also discarded, since discarding the least significant bit causes the value of the lower data S1HPL to become zero, which makes the SIGN BIT unnecessary. As a result, the amount of code is reduced by 2 bits. Regarding the data D4, the least significant bit "0" is discarded from the lower data S1HPL of "010". The SIGN BIT is not discarded, since discarding the least significant bit does not cause the value of the lower data S1HPL to become zero. As a result the amount of code is reduced by 1 bit. Regarding the data D5, the amount of code is similarly reduced by 1 bit. The processing unit 51 counts the reduced amounts of code for each piece of the frequency data S1HP with a counter, so as to obtain a total reduced amount of code for one image when the TRIM FLEXBITS is set at "1". Reduced amounts of code when the TRIM FLEXBITS is set at each value from "2" to "15" are also obtained by the processing unit 51 in the same manner as above. Referring to FIGS. 3 and 4, information on the reduced amounts of code when the TRIM FLEXBITS is set at each value from "1" to "15" is inputted from the processing unit 51 to the holding unit 35 as data S4, and the holding unit 35 creates the data table 60 illustrated in FIG. 7 based on the data S4.

Figure 9:
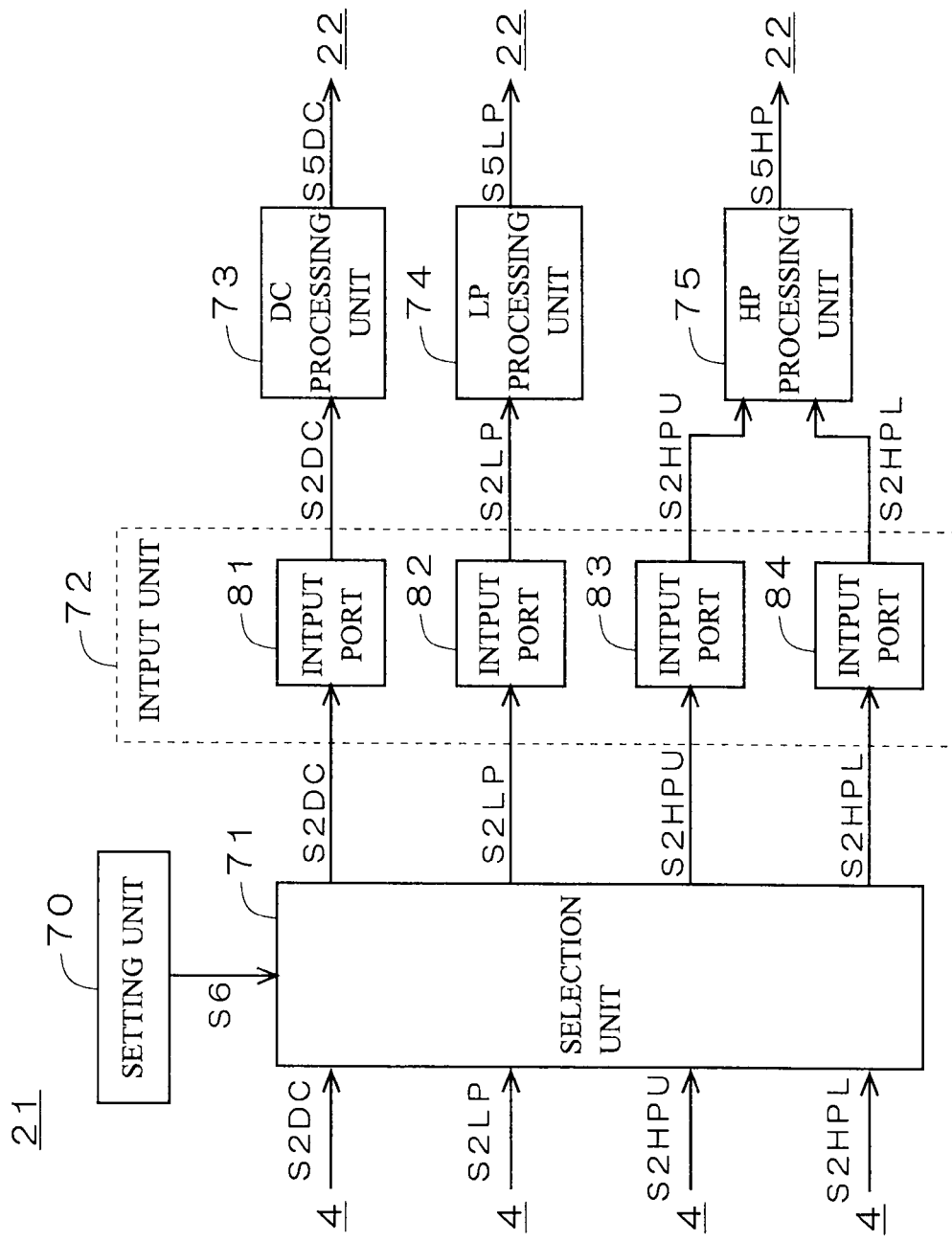
FIG. 9 is a block diagram specifically illustrating a configuration of a decoding unit.

FIG. 9 is a block diagram specifically illustrating a configuration of the decoding unit 21. The decoding unit 21 includes a setting unit 70, a selection unit 71, an input unit 72, a DC processing unit 73, an LP processing unit 74, and an HP processing unit 75. The input unit 72 includes input ports 81 to 84 that allow access to the memory 4 in a DMA mode.

The setting unit 70 sets a reduction ratio of a decoded image. The size of the decoded image can be set at 1/1 (i.e., same size), 1/4 (1/16 in area ratio), or 1/16 (1/256 in area ratio) of that of an image stored in the memory 4. The set reduction ratio is inputted from the setting unit 70 to the selection unit 71 as data S6.

When the setting unit 70 sets the reduction ratio at the same size, the selection unit 71 selects all of the input ports 81 to 84. In such a case, the frequency data S2DC, the frequency data S2LP, the upper data S2HPU, and the lower data S2HPL are inputted from the memory 4 respectively to the input ports 81, 82, 83, and 84. In the frequency mode, the frequency data S2DC, the frequency data S2LP, the upper data S2HPU, and the lower data S2HPL of each macroblock are separately stored respectively in the areas AR5, AR6, AR7, and AR8 in the memory 4. These frequency data corresponding to the same macroblock are read out of respective storage areas AR5 to AR8 and inputted to the input ports 81 to 84, every time data is required for decoding.

The DC processing unit 73 performs entropy decoding on the frequency data S2DC inputted from the input port 81, so as to generate and output frequency data S5DC. The LP processing unit 74 performs entropy decoding on the frequency data S2LP inputted from the input port 82, so as to generate and output frequency data S5LP. The HP processing unit 75 performs entropy decoding on the upper data S2HPU inputted from the input port 83 and then combine with the lower data S2HPL inputted from the input port 84, so as to generate and output frequency data S5HP. The frequency data S5DC, S5LP, and S5HP are outputted from the decoding unit 21, and then processed by the inverse prediction unit 22, the dequantization unit 23, the frequency inverse transform unit 24, and the color inverse conversion unit 25 in a preceding stage, so that a decoded image of the same size is outputted from the decoder 3.

When the setting unit 70 sets the reduction ratio at 1/4, the selection unit 71 selects the input ports 81 and 82. In such a case, the frequency data S2DC and S2LP are inputted from the memory 4 respectively to the input ports 81 and 82. On the other hand, the upper data S2HPU and the lower data S2HPL are not inputted from the memory 4 to the decoding unit 21. The DC processing unit 73 performs entropy decoding on the frequency data S2DC inputted from the input port 81, so as to generate and output frequency data S5DC. The LP processing unit 74 performs entropy decoding on the frequency data S2LP inputted from the input port 82, so as to generate and output frequency data S5LP. The frequency data S5DC and S5LP are outputted from the decoding unit 21, and then processed by the inverse prediction unit 22, the dequantization unit 23, the frequency inverse transform unit 24, and the color inverse conversion unit 25 in a preceding stage, so that a decoded image reduced to 1/4 is outputted from the decoder 3.

The frequency transform unit 12 applies Hadamard transform in frequency transform (PCT) to obtain an average value of pixel data of a block having 4 pixels in column×4 pixels in row. Since the average value in Hadamard transform is obtained by dividing a sum value of 16 pieces of pixel data by "4", rather than "16", the average value obtained by Hadamard transform is four times the actual value. The frequency transform unit 12 obtains the frequency data S1LP of low-frequency component by performing frequency transform (PCT) once, which causes the value of the frequency data S1LP to be four times the actual value. The frequency data S1DC of direct-current component is obtained by performing frequency transform (PCT) twice, which causes the value of the frequency data S1DC to be 16 times the actual value. The difference from the actual value caused by Hadamard transform can be corrected by dividing the value of the frequency data S5LP by "4" and dividing the value of the frequency data S5DC by "16" in an arbitrary stage in the decoder 3.

When the frequency inverse transform unit 24 employs an overlapping filter, one piece of frequency data S5DC and 15 pieces of frequency data S5LP are copied within each block, so as to expand data of one macroblock to have 256 pieces. This enables immediate start of overlapping-filtering.

When the setting unit 70 sets the reduction ratio at 1/16, the selection unit 71 selects the input ports 81 only. In such a case, the frequency data S2DC is inputted from the memory 4 to the input port 81. On the other hand, the frequency data S2LP, the upper data S2HPU, and the lower data S2HPL are not inputted from the memory 4 to the decoding unit 21.

The DC processing unit 73 performs entropy decoding on the frequency data S2DC inputted from the input port 81, so as to generate and output frequency data S5DC. The frequency data S5DC is outputted from the decoding unit 21, and then processed by the inverse prediction unit 22, the dequantization unit 23, the frequency inverse transform unit 24, and the color inverse conversion unit 25 in a preceding stage, so that a decoded image reduced to 1/16 is outputted from the decoder 3. Similar to the above, the difference from the actual value caused by Hadamard transform can be corrected by dividing the value of the frequency data S5DC by "16" in an arbitrary stage in the decoder 3. Moreover, when the frequency inverse transform unit 24 employs an overlapping filter, one piece of frequency data S5DC is copied within a macroblock, so as to expand data of one macroblock to have 256 pieces. This enables immediate start of overlapping-filtering.

Although an example of setting the reduction ratio of a decoded image at 1/4 or 1/16 is described above, it should be noted that an decoded image with a desired reduction ratio can be outputted from the decoder 3, by arranging a resizing unit capable of converting an image to have an arbitrary number of pixels, between, for example, the frequency inverse transform unit 24 and the color inverse conversion unit 25.

Next, a description is given of facilitating control of an amount of code with the image processor 1. Referring to FIG. 3, the HP processing unit 33 generates and outputs information data S3 that includes information indicating whether the value of each piece of the upper data S2HPU is zero or not (corresponding to flag "FG" in FIG. 8A) and information indicating a bit length of the FLEXBITS of each macroblock. The information data S3 is inputted from the HP processing unit 33 to the output port 45, and outputted from the output port 45 to the code amount control unit 5.

Figure 10:
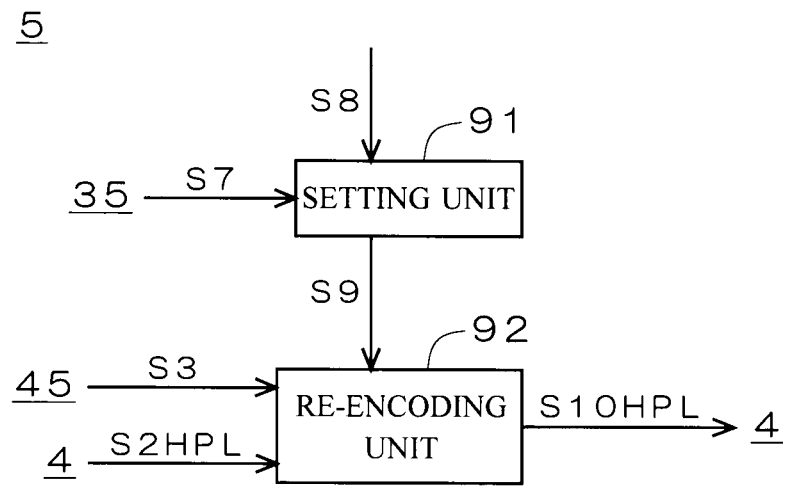
FIG. 10 is a block diagram specifically illustrating a configuration of a code amount control unit.

FIG. 10 is a block diagram specifically illustrating a configuration of the code amount control unit 5. The code amount control unit 5 includes a setting unit 91 and a re-encoding unit 92. The setting unit 91 receives an input of data S8 indicating a target amount of code of an image. The setting unit 91 also receives an input of data S7 indicating the data table 60 illustrated in FIG. 7.

The setting unit 91 compares the amount of code of an image stored in the memory 4 with a target amount of code given by data S8. When the amount of code of the image exceeds the target amount of code, the setting unit 91 refers to the data table 60 to determine whether discarding all of the FLEXBITS (lower data S2HPL) can achieve the amount of code of the image equal to or less than the target amount of code or not. If the amount of code equal to or less than the target amount of code can be achieved, the setting unit 91 refers to the data table 60 to obtain the smallest value of the number of bits to be discarded that achieves the amount of code equal to or less than the target amount of code. Then the setting unit 91 sets TRIM FLEXBITS at the smallest value of the number of bits to be discarded. For example, when the number of bits to be discarded that can achieve the amount of code equal to or less than the target amount of code is "3 bits or more", the TRIM FLEXBITS is set at "3". The information on the set TRIM FLEXBITS is inputted from the setting unit 91 to the re-encoding unit 92 as data S9.

The re-encoding unit 92 reads the lower data S2HPL from the memory 4, and decodes the lower data S2HPL, while identifying the border between the lower data S2HPL pieces and the location of the SIGN BIT based on the information data S3. Then the re-encoding unit 92 performs re-encoding on the lower data S2HPL while applying the TRIM FLEXBITS given by the data S9, so as to generate and output new lower data S10HPL with reduced amount of code. The lower data S2HPL stored in the memory 4 is overwritten with the new lower data S10HPL.

It should be noted that in the description above, when comparison of the amount of code of the image with the target amount of code by the setting unit 91 finds that the amount of code of the image is equal to or less than the target amount of code, the above processing is unnecessary. Moreover, if discarding all of the FLEXBITS cannot achieve the amount of code of the image equal to or less than the target amount of code, it is necessary to change the value of the quantization coefficient to a value greater than the presently set value and then encode all frequency data again. This also applies to a below-described modification illustrated in FIG. 11.

Figure 11:
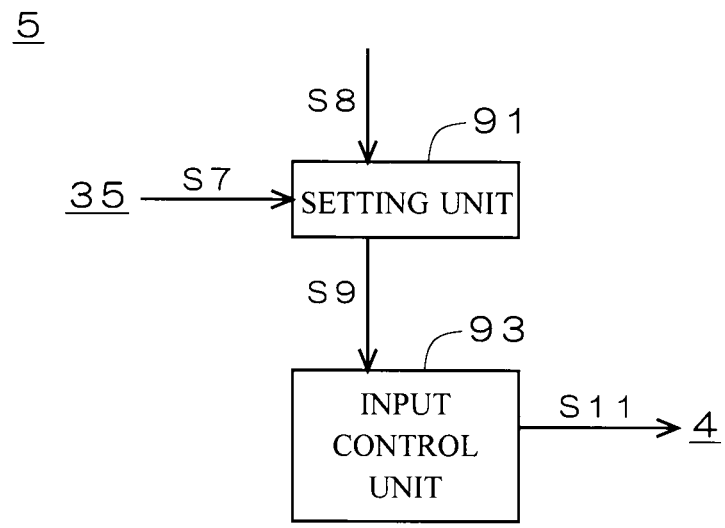
FIG. 11 is a block diagram illustrating another configuration of the code amount control unit.

FIG. 11 is a block diagram illustrating another configuration of the code amount control unit 5. The code amount control unit 5 includes a setting unit 91 and an input control unit 93. The setting unit 91 receives an input of the same data S7 and S8 as in FIG. 10.

Similar to the above, the setting unit 91 compares the amount of code of an image stored in the memory 4 with a target amount of code given by data S8. When the amount of code of the image exceeds the target amount of code, the setting unit 91 refers to the data table 60 to determine whether discarding all of the FLEXBITS can achieve the amount of code of the image equal to or less than the target amount of code or not. If the amount of code equal to or less than the target amount of code can be achieved, the setting unit 91 refers to the data table 60 to obtain the smallest value of the number of bits to be discarded that achieves the amount of code equal to or less than the target amount of code. Then the setting unit 91 sets TRIM FLEXBITS at the smallest value of the number of bits to be discarded. The information on the set TRIM FLEXBITS is inputted from the setting unit 91 to the input control unit 93 as data S9.

The input control unit 93 generates and outputs control data S11 based on the information data S3 and the TRIM FLEXBITS given by the data S9, to control an input of the lower data S2HPL from the memory 4 to the decoding unit 21. For example, when the data D0 to D5 illustrated in FIG. 8A are stored in the memory 4 as the lower data D2HPL and the value of the TRIM FLEXBITS is set at "1", an input of the least significant bit of each data D0 to D5 and the SIGN BIT added to the data D3 to the decoding unit 21 is omitted in inputting the data D0 to D5 to the decoding unit 21. A lower high-frequency stream with a reduced amount of code is thereby inputted from the memory 4 to the decoding unit 21.

As stated above, the output unit 34 in the image processor 1 according to the present embodiment includes output ports 41 to 44 to output a direct-current stream, a low-frequency stream, an upper high-frequency stream, and a lower high-frequency stream to the memory 4. This enables a parallel output of streams of the direct-current stream, the low-frequency stream, the upper high-frequency stream, and the lower high-frequency stream from the output ports 41 to 44 to the memory 4. As a result, processing on the same image does not need to be repeated four times in generating a stream in a frequency mode in JPEG XR using hardware, and therefore time required for processing is reduced.

The output unit 34 includes a first output port 41 to output a direct-current stream, a second output port 42 to output a low-frequency stream, a third output port 43 to output an upper high-frequency stream, and a fourth output port 44 to output a lower high-frequency stream.

This enables a parallel output of the direct-current stream, the low-frequency stream, the upper high-frequency stream, and the lower high-frequency stream respectively from the first output port 41, the second output port 42, the third output port 43, and the fourth output port 44 to the memory 4. As a result, processing on the same image once is sufficient in generating a stream in a frequency mode in JPEG XR using hardware, and therefore time required for processing is further reduced.

The input unit 72 includes input ports 81 to 84 to input a direct-current stream, a low-frequency stream, an upper high-frequency stream, and a lower high-frequency stream from the memory 4. This enables a parallel input of streams of the direct-current stream, the low-frequency stream, the upper high-frequency stream, and the lower high-frequency stream from the memory 4 to the input ports 81 to 84. As a result, reading for the same image does not need to be repeated four times in reading a stream in a frequency mode in JPEG XR from the memory 4 to input to the decoding unit 21, and therefore time required for processing is reduced. Moreover, in the frequency mode, the frequency data S2DC, the frequency data S2LP, the upper data S2HPU, and the lower data S2HPL of each macroblock are separately stored respectively in the areas AR5, AR6, AR7, and AR8 in the memory 4. The image processor 1 according to the present invention reads these frequency data corresponding to the same macroblock from the respective storage areas and inputs to the decoding unit 21, every time data is required for decoding. This enables the decoding unit 21 to perform decoding of each macroblock with no problem.

The input unit 72 includes a first input port 81 to input a direct-current stream, a second input port 82 to input a low-frequency stream, a third input port 83 to input an upper high-frequency stream, and a fourth input port 84 to input a lower high-frequency stream. This enables a parallel input of the direct-current stream, the low-frequency stream, the upper high-frequency stream, and the lower high-frequency stream from the memory 4 respectively to the first input port 81, the second input port 82, the third input port 83, and the fourth input port 84. As a result, reading for the same macroblock once is sufficient in reading a stream in a frequency mode in JPEG XR from the memory 4 to input to the decoding unit 21, and therefore time required for processing is further reduced.

The selection unit 71 selects at least one stream from a direct-current stream, a low-frequency stream, an upper high-frequency stream, and a lower high-frequency stream to input from the memory 4 to the decoding unit 21, based on the reduction ratio set by the setting unit 70. When the reduction ratio is set at 1/16, for example, only the direct-current stream is selected, and when the reduction ratio is set at 1/4, the direct-current stream and the low-frequency stream are selected. This facilitates creation of a reduced image. Moreover, preventing an input from the memory 4 to the decoding unit 21 of an unnecessary stream that is not used for creation of a reduced image helps avoidance of useless decoding of the unnecessary stream.

The holding unit 35 holds the data table 60 in which amounts of code of an image to be reduced by discarding a digit from the lower data S2HPL in an ascending order from its least significant bit are described for each number of bits to be discarded. Thus use of the data table 60 held in the holding unit 35 facilitates control of an amount of code to achieve an amount of code of an image equal to or less than a target amount of code.

As illustrated in FIG. 10, the code amount control unit 5 receives from the encoding unit 15 an input of the information data S3 that includes information indicating whether the value of each piece of the upper data S2HPU is zero or not and information indicating a bit length of each piece of the lower data S2HPL. The setting unit 91 refers to the data table 60 held in the holding unit 35, so as to set a number of bits (TRIM FLEXBITS) to be discarded from each piece of the lower data S2HPL to achieve an amount of code of the image equal to or less than the target amount of code. The re-encoding unit 92 re-encodes the lower high-frequency stream stored in the memory 4, based on the information data S3 and the TRIM FLEXBITS set by the setting unit 91. In this way, re-encoding is performed on the lower high-frequency stream so that a part (or all) of each piece of the lower data S2HPL is discarded, and decoding of the lower high-frequency stream after re-encoding is performed, so as to achieve an amount of code of a decoded image outputted from the decoder 3 that is equal to or less than the target amount of code.

As illustrated in FIG. 11, the code amount control unit 5 receives from the encoding unit 15 an input of the information data S3 that includes information indicating whether the value of each piece of the upper data S2HPU is zero or not and information indicating a bit length of each piece of the lower data S2HPL. The setting unit 91 refers to the data table 60 held in the holding unit 35, so as to set a number of bits (TRIM FLEXBITS) to be discarded from each piece of the lower data S2HPL to achieve an amount of code of the image equal to or less than the target amount of code. The input control unit 93 controls an input of the lower high-frequency stream from the memory 4 to the decoding unit 21, based on the information data S3 and the TRIM FLEXBITS set by the setting unit 91. Control by the input control unit 93 to prevent an input of a part (or all) of each piece of the lower data S2HPL from the memory 4 to the decoding unit 21 substantially realizes an input to the decoding unit 21 of the lower high-frequency stream with a part (or all) of each piece of the lower data S2HPL being discarded. Decoding such lower high-frequency stream achieves an amount of code of a decoded image outputted from the decoder 3 that is equal to or less than the target amount of code.

While the invention has been described in detail, the foregoing description is in all aspects illustrative and not restrictive. It is understood that numerous other modifications and variations can be devised without departing from the scope of the invention.

What is claimed is:

1. An image processor comprising:
a transform unit configured to perform predetermined transform on a plurality of pixel data pieces of a predetermined pixel block in an image to generate frequency data of direct-current component, frequency data of low-frequency component, and frequency data of high-frequency component;
an encoding unit; and
a memory,
the encoding unit including
a direct-current processing unit configured to sequentially perform predetermined encoding on frequency data of direct-current component of each of a plurality of pixel blocks in the image to generate a direct-current stream including a plurality of frequency data pieces of direct-current component of the image;
a low-frequency processing unit configured to sequentially perform predetermined encoding on frequency data of low-frequency component of each of the plurality of pixel blocks in the image to generate a low-frequency stream including a plurality of frequency data pieces of low-frequency component of the image;
a high-frequency processing unit configured to sequentially perform predetermined encoding on frequency data of high-frequency component of each of the plurality of pixel blocks in the image to generate an upper high-frequency stream including a plurality of upper data pieces in a digit range to the upper side of a predetermined position of a plurality of frequency data pieces of high-frequency component of the image and a lower high-frequency stream including a plurality of lower data pieces in a digit range to the lower side of the predetermined position of the plurality of frequency data pieces of high-frequency component of the image; and
an output unit having a plurality of output ports to output the direct-current stream, the low-frequency stream, the upper high-frequency stream, and the lower high-frequency stream to the memory.

2. The image processor according to claim 1, wherein the output unit has
a first output port to output the direct-current stream;
a second output port to output the low-frequency stream;
a third output port to output the upper high-frequency stream; and
a fourth output port to output the lower high-frequency stream.

3. The image processor according to claim 2, further comprising:
a decoding unit including an input unit having a plurality of input ports to receive an input of the direct-current stream, the low-frequency stream, the upper high-frequency stream, and the lower high-frequency stream from the memory.

4. The image processor according to claim 3, wherein the input unit has
a first input port to input the direct-current stream;
a second input port to input the low-frequency stream;
a third input port to input the upper high-frequency stream; and
a fourth input port to input the lower high-frequency stream.

5. The image processor according to claim 4, wherein the decoding unit further includes
a setting unit configured to set a reduction ratio of the image; and a selection unit configured to select at least one stream from the direct-current stream, the low-frequency stream, the upper high-frequency stream, and the lower high-frequency stream to input from the memory to the decoding unit, based on the reduction ratio set by the setting unit.

6. The image processor according to claim 5, wherein the encoding unit further includes a holding unit configured to hold an amount of code of the image to be reduced by discarding a digit from each of the plurality of lower data pieces in an ascending order from the least significant digit, for each number of digits to be discarded.

7. The image processor according to claim 6, further comprising:
a code amount control unit,
the output unit having a fifth output port to output, to the code amount control unit, information data including information indicating whether a value of each of the plurality of upper data pieces is zero or not and information indicating a bit length of each of the plurality of lower data pieces,
the code amount control unit including
a setting unit configured to refer to the holding unit to set a number of digits to be discarded from each of the plurality of lower data pieces to achieve an amount of code of the image equal to or less than a target amount of code; and
a re-encoding unit configured to perform re-encoding on the lower high-frequency stream stored in the memory, based on the information data and a number of digits to be discarded set by the setting unit.

8. The image processor according to claim 6, further comprising:
a code amount control unit,
the output unit having a fifth output port to output, to the code amount control unit, information data including information indicating whether a value of each of the plurality of upper data pieces is zero or not and information indicating a bit length of each of the plurality of lower data pieces,
the code amount control unit including
a setting unit configured to refer to the holding unit to set a number of digits to be discarded from each of the plurality of lower data pieces to achieve an amount of code of the image equal to or less than a target amount of code; and
an input control unit configured to control an input of the lower high-frequency stream from the memory to the decoding unit, based on the information data and a number of digits to be discarded set by the setting unit.

9. The image processor according to claim 3, wherein the decoding unit further includes
a setting unit configured to set a reduction ratio of the image; and
a selection unit configured to select at least one stream from the direct-current stream, the low-frequency stream, the upper high-frequency stream, and the lower high-frequency stream to input from the memory to the decoding unit, based on the reduction ratio set by the setting unit.

10. The image processor according to claim 1, further comprising:
a decoding unit including an input unit having a plurality of input ports to receive an input of the direct-current stream, the low-frequency stream, the upper high-frequency stream, and the lower high-frequency stream from the memory.

11. The image processor according to claim 10, wherein the input unit has
a first input port to input the direct-current stream;
a second input port to input the low-frequency stream;
a third input port to input the upper high-frequency stream; and
a fourth input port to input the lower high-frequency stream.

12. The image processor according to claim 11, wherein the decoding unit further includes
a setting unit configured to set a reduction ratio of the image; and
a selection unit configured to select at least one stream from the direct-current stream, the low-frequency stream, the upper high-frequency stream, and the lower high-frequency stream to input from the memory to the decoding unit, based on the reduction ratio set by the setting unit.

13. The image processor according to claim 10, wherein the decoding unit further includes
a setting unit configured to set a reduction ratio of the image; and
a selection unit configured to select at least one stream from the direct-current stream, the low-frequency stream, the upper high-frequency stream, and the lower high-frequency stream to input from the memory to the decoding unit, based on the reduction ratio set by the setting unit.

14. The image processor according to claim 1, wherein the encoding unit further includes a holding unit configured to hold an amount of code of the image to be reduced by discarding a digit from each of the plurality of lower data pieces in an ascending order from the least significant digit, for each number of digits to be discarded.

15. The image processor according to claim 14, further comprising:
a code amount control unit,
the output unit having a fifth output port to output, to the code amount control unit, information data including information indicating whether a value of each of the plurality of upper data pieces is zero or not and information indicating a bit length of each of the plurality of lower data pieces,
the code amount control unit including
a setting unit configured to refer to the holding unit to set a number of digits to be discarded from each of the plurality of lower data pieces to achieve an amount of code of the image equal to or less than a target amount of code; and
a re-encoding unit configured to perform re-encoding on the lower high-frequency stream stored in the memory, based on the information data and a number of digits to be discarded set by the setting unit.

16. The image processor according to claim 14, further comprising:
a code amount control unit,
the output unit having a fifth output port to output, to the code amount control unit, information data including information indicating whether a value of each of the plurality of upper data pieces is zero or not and information indicating a bit length of each of the plurality of lower data pieces,
the code amount control unit including
a setting unit configured to refer to the holding unit to set a number of digits to be discarded from each of the plurality of lower data pieces to achieve an amount of code of the image equal to or less than a target amount of code; and an input control unit configured to control an input of the lower high-frequency stream from the memory to the decoding unit, based on the information data and a number of digits to be discarded set by the setting unit.

17. An image processor comprising:
a decoding unit; and
a memory configured to store
a direct-current stream including a plurality of frequency data pieces of direct-current component of an image obtained by sequentially performing predetermined encoding on frequency data of direct-current component of each of a plurality of pixel blocks in the image,
a low-frequency stream including a plurality of frequency data pieces of low-frequency component of the image obtained by sequentially performing predetermined encoding on frequency data of low-frequency component of each of the plurality of pixel blocks in the image, and
an upper high-frequency stream including a plurality of upper data pieces in a digit range to the upper side of a predetermined position of a plurality of frequency data pieces of high-frequency component of the image and a lower high-frequency stream including a plurality of lower data pieces in a digit range to the lower side of the predetermined position of the plurality of frequency data pieces of high-frequency component of the image, obtained by sequentially performing predetermined encoding on frequency data of high-frequency component of each of the plurality of pixel blocks in the image,
the decoding unit including
a setting unit configured to set a reduction ratio of the image; and
a selection unit configured to select at least one stream from the direct-current stream, the low-frequency stream, the upper high-frequency stream, and the lower high-frequency stream to input from the memory to the decoding unit, based on the reduction ratio set by the setting unit.

18. An image processor comprising:
a decoding unit;
a memory;
a code amount control unit; and
a holding unit,
the memory being configured to store
a direct-current stream including a plurality of frequency data pieces of direct-current component of an image obtained by sequentially performing predetermined encoding on frequency data of direct-current component of each of a plurality of pixel blocks in the image,
a low-frequency stream including a plurality of frequency data pieces of low-frequency component of the image obtained by sequentially performing predetermined encoding on frequency data of low-frequency component of each of the plurality of pixel blocks in the image, and
an upper high-frequency stream including a plurality of upper data pieces in a digit range to the upper side of a predetermined position of a plurality of frequency data pieces of high-frequency component of the image and a lower high-frequency stream including a plurality of lower data pieces in a digit range to the lower side of the predetermined position of the plurality of frequency data pieces of high-frequency component of the image, obtained by sequentially performing predetermined encoding on frequency data of high-frequency component of each of the plurality of pixel blocks in the image,
the holding unit being configured to hold an amount of code of the image to be reduced by discarding a digit from each of the plurality of lower data pieces in an ascending order from the least significant digit, for each number of digits to be discarded, and
the code amount control unit including
a setting unit configured to refer to the holding unit to set a number of digits to be discarded from each of the plurality of lower data pieces to achieve an amount of code of the image equal to or less than a target amount of code; and
a re-encoding unit configured to perform re-encoding on the lower high-frequency stream stored in the memory, based on information indicating whether a value of each of the plurality of upper data pieces is zero or not, information indicating a bit length of each of the plurality of lower data pieces, and a number of digits to be discarded set by the setting unit.

19. An image processor comprising:
a decoding unit;
a memory;
a code amount control unit; and
a holding unit,
the memory being configured to store
a direct-current stream including a plurality of frequency data pieces of direct-current component of an image obtained by sequentially performing predetermined encoding on frequency data of direct-current component of each of a plurality of pixel blocks in the image,
a low-frequency stream including a plurality of frequency data pieces of low-frequency component of the image obtained by sequentially performing predetermined encoding on frequency data of low-frequency component of each of the plurality of pixel blocks in the image, and
an upper high-frequency stream including a plurality of upper data pieces in a digit range to the upper side of a predetermined position of a plurality of frequency data pieces of high-frequency component of the image and a lower high-frequency stream including a plurality of lower data pieces in a digit range to the lower side of the predetermined position of the plurality of frequency data pieces of high-frequency component of the image, obtained by sequentially performing predetermined encoding on frequency data of high-frequency component of each of the plurality of pixel blocks in the image,
the holding unit being configured to hold an amount of code of the image to be reduced by discarding a digit from each of the plurality of lower data pieces in an ascending order from the least significant digit, for each number of digits to be discarded, and
the code amount control unit including
a setting unit configured to refer to the holding unit to set a number of digits to be discarded from each of the plurality of lower data pieces to achieve an amount of code of the image equal to or less than a target amount of code; and
an input control unit configured to control an input from the memory to the decoding unit of the lower high-frequency stream, based on information indicating whether a value of each of the plurality of upper data pieces is zero or not, information indicating a bit length of each of the plurality of lower data pieces, and a number of digits to be discarded set by the setting unit.

* * * * *